US012367648B2

(12) United States Patent
Wolfensparger et al.

(10) Patent No.: US 12,367,648 B2
(45) Date of Patent: Jul. 22, 2025

(54) OPTIMIZING IMAGE OFFLOADING IN EDGE-ASSISTED AUGMENTED REALITY

(71) Applicant: Charter Communications Operating, LLC, St. Louis, MO (US)

(72) Inventors: Dell Lawrence Wolfensparger, Seaview, WA (US); Viviane Espinoza McLandrich, Denver, CO (US); Christopher Glen Turner, Aurora, CO (US); Yu Charlie Hu, West Lafayette, IN (US); Zhaoning Kong, West Lafayette, IN (US); Pranab Dash, West Lafayette, IN (US)

(73) Assignee: Charter Communications Operating, LLC, St. Louis, MO (US)

( * ) Notice: Subject to any disclaimer, the term of this patent is extended or adjusted under 35 U.S.C. 154(b) by 208 days.

(21) Appl. No.: 18/313,042

(22) Filed: May 5, 2023

(65) Prior Publication Data

US 2024/0371111 A1    Nov. 7, 2024

(51) Int. Cl.
*G06T 19/00* (2011.01)
*G06V 10/74* (2022.01)

(52) U.S. Cl.
CPC .......... *G06T 19/006* (2013.01); *G06V 10/761* (2022.01)

(58) Field of Classification Search
None
See application file for complete search history.

(56) References Cited

U.S. PATENT DOCUMENTS

| 11,800,404 | B1* | 10/2023 | Yang | G06F 9/547 |
| 2009/0097764 | A1 | 4/2009 | Sung | |
| 2019/0356905 | A1 | 11/2019 | Godard et al. | |
| 2021/0110191 | A1* | 4/2021 | Gruteser | G06N 3/045 |
| 2023/0326204 | A1* | 10/2023 | Meng | H04N 21/8456 |
| | | | | 382/103 |

OTHER PUBLICATIONS

Author Unknown, "Fundamental concepts," ARCore, https://developers.google.com/ar/develop/fundamentals, 2022, 5 pages.
Author Unknown, "Mobile AR market revenue worldwide 2021-2026", Retrieved from internet: /https://www.statista.com/statistics/282453/mobile-augmented realitymarket-size/, Aug. 18, 2022, 3 pages.
Barron et al., "Performance of optical flow techniques," International Journal of Computer Vision 12, 1 (1994), https://doi.org/10.1007/BF01420984, pp. 43-77.

(Continued)

*Primary Examiner* — Michael J Cobb
(74) *Attorney, Agent, or Firm* — Dority & Manning, P.A.

(57) ABSTRACT

An offloading schedule for offloading image frames that are to be generated by an AR device in a subsequent time period is determined, the offloading schedule identifying certain image frames generated in the subsequent time period that are to be offloaded and certain image frames generated in the subsequent time period that are not to be offloaded, the offloading schedule being selected from a plurality of offloading schedules based on a tracking stride of the offloading schedule. The AR device sends to a computing device at least some of the image frames generated in the subsequent time period in accordance with the offloading schedule.

20 Claims, 8 Drawing Sheets

(56) References Cited

OTHER PUBLICATIONS

Chen et al., "Glimpse: Continuous, Real-Time Object Recognition on Mobile Devices," Proceedings of the 13th ACM Conference on Embedded Networked Sensor Systems, 2015, pp. 155-168.
Liu et. al., "Edge Assisted Real-time Object Detection for Mobile Augmented Reality," The 25th Annual International Conference on Mobile Computing and Networking, https://doi.org/10.1145/3300061.3300116, Aug. 2019, pp. 1-16.
Meng et al., "Edge-assisted AR Design Made Simple: Video Encoding and Local Tracking are Enough," https://www.winlab.rutgers.edu/~gruteser/papers/mobicom19_augmented_reality.pdf, Purdue University, 2019, pp. 1-6.
Narayanan et al., "Lumos5G: Mapping and Predicting Commercial mmWave 5G Throughput," Proceedings of the ACM Internet Measurement Conference, Oct. 2020, 18 pages.
Zhu et al., "Deep Feature Flow for Video Recognition", Proceedings of the IEEE Conference on Computer Vision and Pattern Recognition, 2017, pp. 2349-2358.
Office Action from U.S. Appl. No. 17/703,674, mailed on Jun. 6, 2024, 20 pages.
Notice of Allowance and Notice of Allowability for U.S. Appl. No. 17/703,674, dated Feb. 24, 2025, 11 pages.

\* cited by examiner

OPTIMIZING IMAGE OFFLOADING IN EDGE-ASSISTED AUGMENTED REALITY

BACKGROUND

Augmented reality (AR) is increasingly popular but can involve a substantial amount of processing power for AR tasks, such as object detection.

SUMMARY

The embodiments disclosed herein optimize image offloading in edge-assisted augmented reality.

In one embodiment a method is provided. The method includes determining, by an augmented reality (AR) device, a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule. The method further includes sending, by the AR device to the computing device, at least some of the image frames generated in the first subsequent time period in accordance with the first offloading schedule.

In another embodiment an augmented reality (AR) device is provided. The AR device includes a camera, a memory, and a processor device coupled to the memory and the camera and being operable to determine a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule. The processor device is further operable to send, to the computing device, at least some of the image frames generated in the first subsequent time period in accordance with the first offloading schedule.

In another embodiment a non-transitory computer-readable storage medium is provided. The non-transitory computer-readable storage medium includes executable instructions configured to cause a processor device of an augmented reality (AR) device to determine a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule. The instructions further cause the processor device to send, to the computing device, at least some of the image frames generated in the first subsequent time period in accordance with the first offloading schedule.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as Augmented reality (AR) refers to the presentation of a combination of computer-generated imagery and a real-world scene to a user. AR devices can comprise computing tablets, smartphones, laptop devices, and any other portable computing device that has a camera and a display device. AR devices can also be head-mounted. A video see-through head-mounted AR device may have a display screen, such as a liquid crystal display (LCD) or organic light-emitting diode (OLED) display screen, which is positioned near the user's eyes. The head-mounted AR device presents a real-time camera feed of a scene in the real-world on the display screen and superimposes computer-generated imagery at certain locations on the display screen. An optical see-through head-mounted AR device has a transparent lens through which the viewer views the real world, and a reflective interior surface on which computer-generated imagery can be projected and reflected into the user's eyes. The term "AR" as used herein also includes mixed reality.

Irrespective of the type of AR device, certain AR tasks are typically implemented to provide an immersive AR experience, including, by way of non-limiting example, object detection, pose estimation, and depth estimation. Object detection is the identification of objects in a scene viewed by a user. Pose estimation is an estimation of the pose of the user using the AR device, such as an orientation of the field of view (FOV) of the camera of the AR device, and depth estimation is the estimation of depths (Z-values), in a three-dimensional space, of pixels in an image frame.

Each of these AR tasks can play a role in providing a fluid, seamless, and immersive AR experience. Unfortunately, one or more of these AR tasks can require substantial processing power. As an example, object detection is typically performed by a machine learning model, such as a deep neural network (DNN), that requires sufficient processing power and computing resources to identify objects in an acceptable time frame. Many AR devices have relatively meager computing resources relative to the computing resources needed to perform object detection.

Image frames can be offloaded (i.e., transmitted) to a server that has sufficient processing capabilities and an object detection DNN. The server can perform object detection on the image frame and send the results back to the AR device. However, the combination of uplink transfer time (UTT), deep neural network inference time (i.e., server processing time), and downlink transfer time (DTT) typically results in the AR device receiving the object detection results several frames after the image frame was uploaded. The AR device must then use the object detection results from an old image frame for several subsequent image frames while the AR device awaits the results of the most recently uploaded image frame. This delay introduces tracking errors that can be perceptible to the user. As the user moves the field of view of the AR device, the object detection results become stale, and thus inaccurate, resulting in unrealistic AR imagery. For example, an AR object may inadvertently overlap a real-world object that should not be overlapped. This leads to user dissatisfaction.

The embodiments disclosed herein optimize image offloading in edge-assisted augmented reality. In particular, the embodiments identify an offloading schedule (sometimes referred to herein as "schedule" for purposes of brevity) that identifies, based on a criteria, an offloading schedule for a subsequent time period. The offloading schedule identifies certain image frames that are to be generated in the subsequent time period that are to be offloaded, and certain image frames that are to be generated in the subsequent time period that are not to be offloaded. The embodiments, among other advantages, generate offloading schedules that minimize the staleness of image processing results to reduce tracking errors and thus provide a more seamless and immersive AR experience to a user.

Figure 1A:
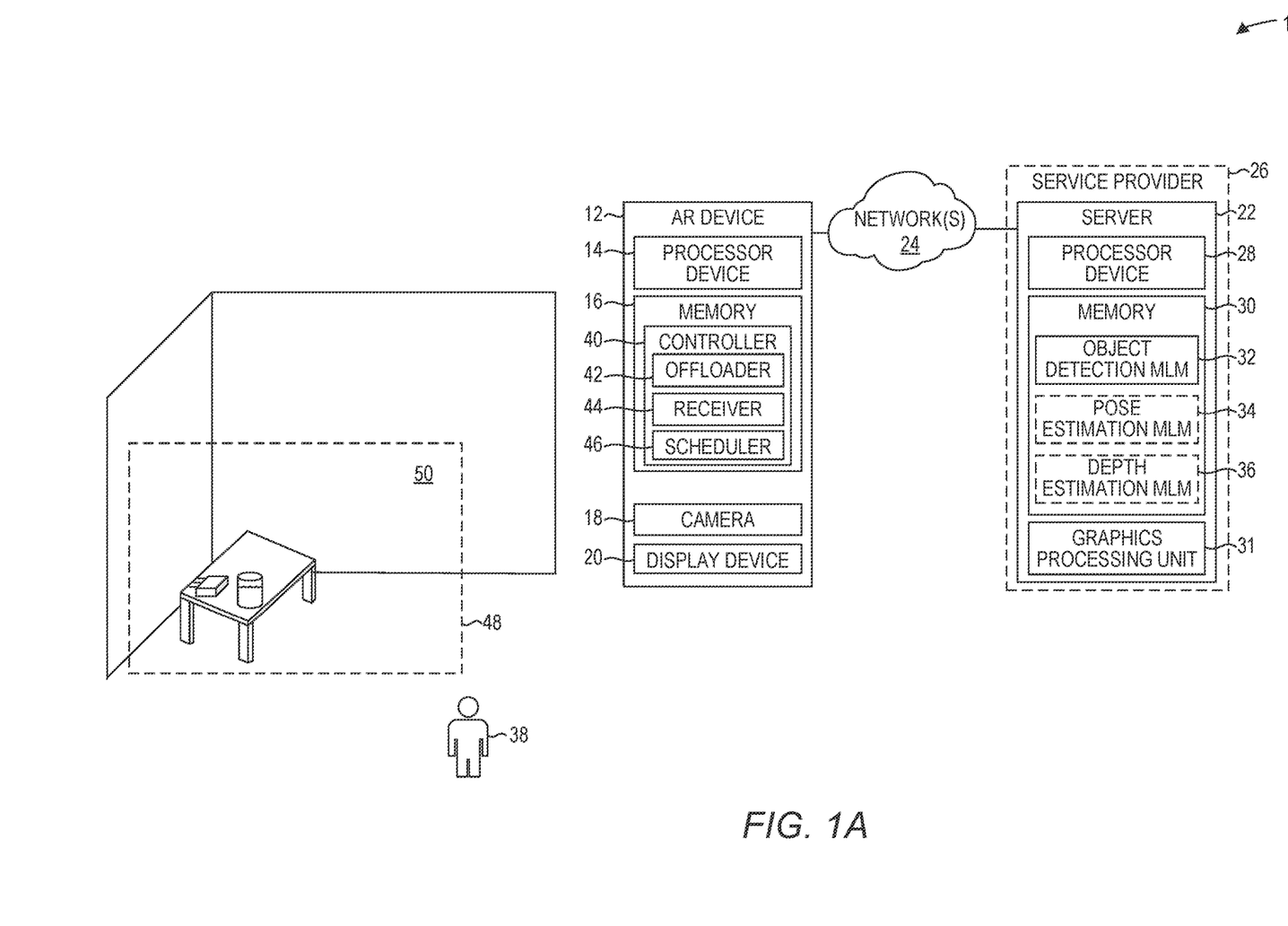
FIGS. 1A and 1B are block diagrams of an environment for optimizing image offloading in edge-assisted augmented reality (AR) according to some embodiments.

FIG. 1A is a block diagram of an environment 10 for optimizing image offloading in edge-assisted AR according to some embodiments. The environment 10 includes an AR device 12, which includes a processor device 14, a memory 16, a camera 18, and a display device 20. The AR device 12 may comprise any computing device capable of implementing AR, such as a computing tablet, a smartphone, a laptop computer, a video see-through head-mounted AR device, an optical see-through head-mounted AR device, or the like.

The AR device 12 wirelessly communicates with a computing device, such as a server 22, via one or more networks 24. The server 22 may be owned and operated by a service provider 26. In this embodiment, the server 22 is an edge server of a large service provider network via which the service provider 26 provides services, such as video services, data services, and the like, to thousands or millions of customers. In some examples, the server 22 may be located in a neighborhood node of a hybrid fiber coaxial (HFC) data network. In some embodiments, the server 22 may be part of or housed with a cellular base station that provides cellular services to a user of the AR device 12. The one or more networks 24 may comprise, by way of non-limiting example a coaxial cable network, a fiber network, a cellular network, an HFC network, or the like.

The server 22 includes a processor device 28 and a memory 30. The server 22 may also include one or more graphics processing units (GPUs) 31 that are used to execute one or more machine learning models (MLMs). The server 22 includes an object detection MLM 32. In some embodiments, the server 22 may also include a pose estimation MLM 34 and a depth estimation MLM 36. The object detection MLM 32 is an MLM, such as a deep neural network (DNN), that has been trained to identify objects in an image frame and provide object detection results to the AR device 12. The AR device 12 can use the object detection results to, for example, determine the placement of AR imagery with respect to the objects. In some embodiments, the object detection results may be, for each detected object, a bounding box that comprises location information that identifies the location of one or more objects depicted in an image frame. In some embodiments, the object detection results comprise, for each detected object, four floating point values that define a rectangle (e.g., bounding box) in the image frame that encompasses the detected object, and a prediction confidence for the detected object.

The pose estimation MLM 34 is an MLM trained to identify, based on an image frame, the pose of the user, such as the orientation of the head of the user. The depth estimation MLM 36 is an MLM trained to generate, based on an image frame, a depth map that contains a depth value for each pixel in the image frame.

The camera 18 has a field of view (FOV) 48 that defines a scene 50 that is captured in an image frame of the camera 18. The exact scene that is captured changes as a user 38 moves the FOV in the real world. The term "frame" or "frame interval" as used herein refers to an interval of time. The term "image" or "image frame" as used herein refers to an image that depicts the scene captured by the camera 18 for a particular frame interval. The interval of time of a frame (i.e., the frame interval) may differ from camera to camera. For example, each frame interval is 16.7 milliseconds for a camera operating at a 60 frames per second (FPS) frame rate. As another example, each frame interval is 33.4 milliseconds for a camera operating at a 30 FPS frame rate. Each frame interval, the camera 18 captures an image at the particular resolution of the camera 18. The image resolution may be, for example, HD, 4K, or any other resolution. In some implementations, the object detection images may be 640×480 or 320×240; however, the embodiments are not limited to any particular resolution. The greater the resolution, the greater the amount of data of the image, and the longer it will take to offload the image frame given a constant network bandwidth. The terms "offload" and "offloading" refer to the transfer of an image frame from the AR device 12 to the server 22.

The AR device 12 includes a controller 40 that includes an offloader 42 that is operable to offload (i.e., transmit) image frames to the server 22, a receiver 44 that is operable to receive image processing results from the server 22 and to determine various timings, as discussed in greater detail below, and a scheduler 46 that is operable to generate a schedule that identifies which subsequently generated image frames are to be offloaded to the server 22.

It is noted that, while the offloader 42, the receiver 44 and the scheduler 46 are shown as separate components of the controller 40, this is primarily for purposes of explanation, and, in other implementations, the offloader 42, the receiver 44, and the scheduler 46 may be implemented in a single component or could be implemented in a greater number of components than three.

Moreover, because the controller 40 is a component of the AR device 12, functionality implemented by the controller 40 may be attributed to the AR device 12 generally. Further, in examples where the controller 40 comprises software instructions that program the processor device 14 to carry out functionality discussed herein, functionality implemented by the controller 40 may be attributed herein to the processor device 14.

As an example of offloading an image frame processing task in edge-assisted AR, assume that the user 38 manipulates the AR device 12 such that the FOV 48 of the camera 18 encompasses the scene 50. It will be assumed solely for purposes of illustration that the camera 18 operates at a 30 FPS frame rate, and thus the frame interval is 33.4 ms. The camera 18 generates an image frame. The image frame comprises the image data generated by, for example, a charge-coupled device (CCD) or other sensor of the camera 18 at the resolution of such CCD or other sensor.

A controller 40 may compress (e.g., encode) the image frame to generate a compressed image frame 43. The controller 40 may use any suitable compression algorithm, such as an H.264 encoding algorithm or the like. If the image frame is compressed, any suitable compression may be used, such as lossy or lossless compression. The controller 40 then offloads, e.g., transmits, the compressed image frame 43 to the server 22. Any suitable proprietary or conventional protocol may be used to communicate between the AR device 12 and the server 22, including, by way of non-limiting example, UDP, TCP or the like.

The server 22 receives the compressed image frame 43 and decodes the compressed image frame 43 to generate a decoded image frame. The server 22 inputs the decoded image frame into the object detection MLM 32 and sends (i.e., downloads) object detection results generated by the object detection MLM 32 to the AR device 12.

Figure 1B:
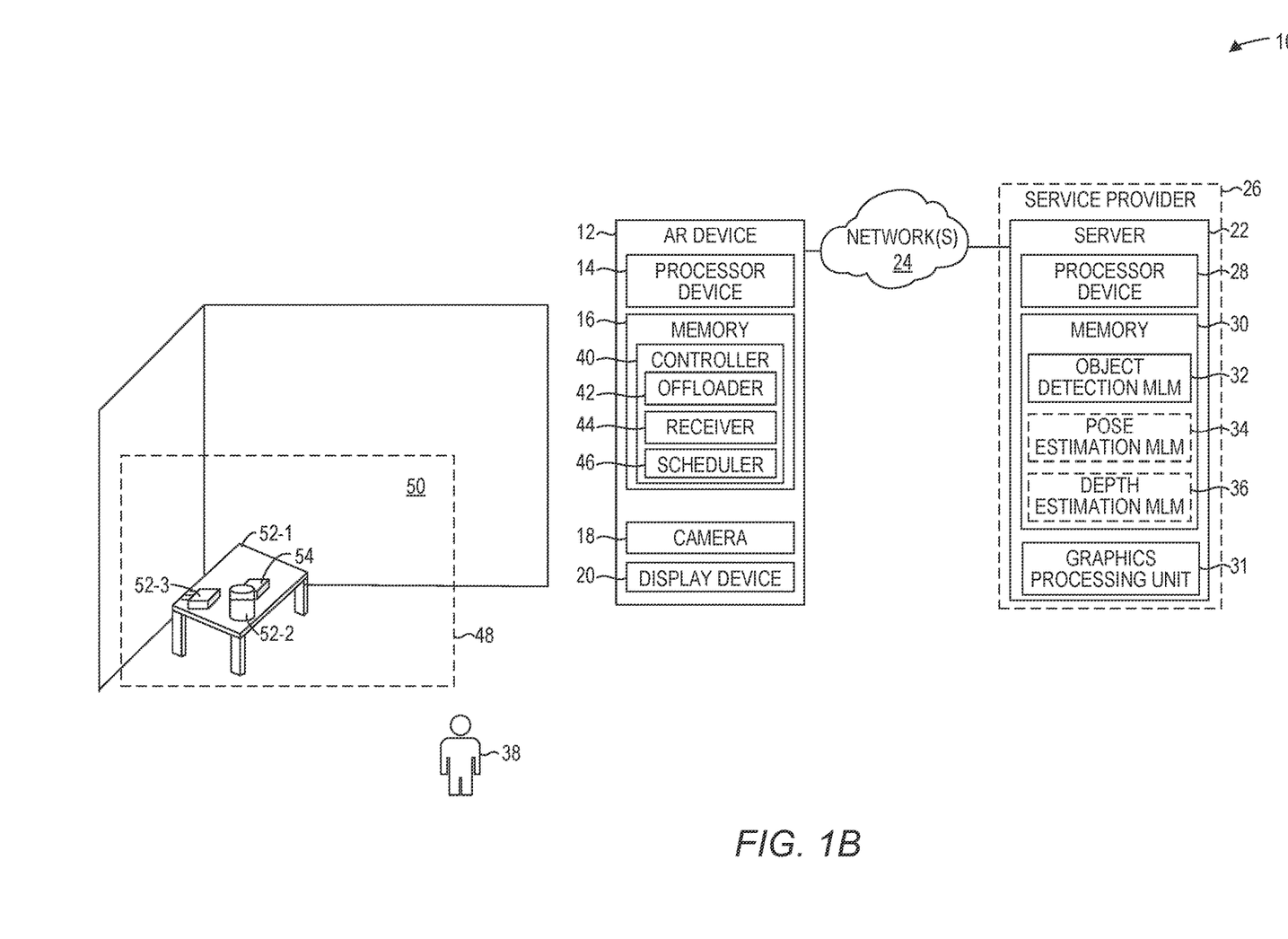

Referring now to FIG. 1B, the AR device 12 may use the object detection results for AR object placement. In this example, the object detection results include three bounding boxes that identify objects 52-1, 52-2, and 52-3 depicted in the decoded image frame. In this example, the AR device 12 generates an AR object 54 and presents the AR object 54 in conjunction with the real-world scene 50 to the user 38 on the display device 20. The AR device 12 depicts the AR object 54 as being partially occluded by the object 52-2 based on the object detection results.

Typically, the uplink transfer time (UTT) for an image frame to be communicated from the AR device 12 to the server 22, a downlink transfer time (DTT) for image processing results (in this example, objection detection results) generated by the server 22 based on the image frame to be communicated from the server 22 to the AR device 12, the image processing time for the server 22 to process the image to generate the image processing results, is greater than the frame interval rate of the AR device 12. Accordingly, the image processing results are "stale" in that they reflect the scene at a point in the past. It is preferable that image processing results be as current (i.e., least stale) as possible because stale image processing results can result in unrealistic AR imagery, particularly when the user 38 is moving the FOV 48 rapidly. For example, a generated AR object may inadvertently overlap a real-world object that should not be overlapped. This leads to user dissatisfaction.

Figure 2:
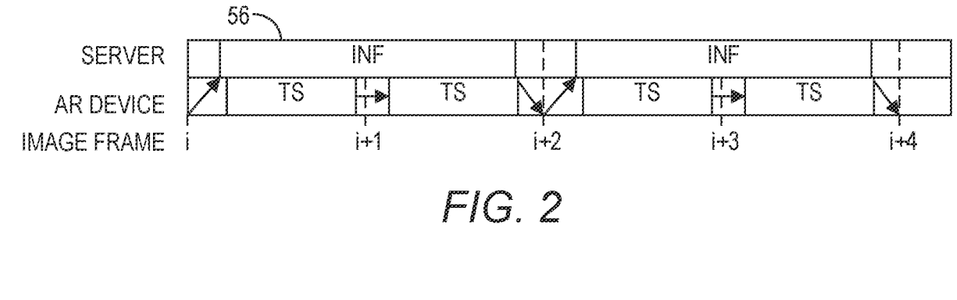
FIG. 2 is a block diagram illustrating a tracking stride that is measured as the image frame difference between a most recently generated image frame and a most recent previous image frame for which an AR device has received image processing results from a computing device.

FIG. 2 is a block diagram illustrating a tracking stride that is measured as the frame ID difference between the most recently generated image frame and the most recent previous image frame for which the AR device 12 has received image processing results from the server 22. In this example, an image frame i is offloaded from the AR device 12 to the server 22. The server 22 processes the image frame i for an image processing time 56 (labelled "INF" for inference time). This is the time it takes the object detection MLM 32 to generate the image processing results based on the image frame i. The server 22 sends the image processing results to the AR device 12 at the same time the AR device 12 uploads the image frame i+1 to the server 22. In this example, the tracking stride is two. When the tracking stride is determined for a number of successive image generations, the tracking stride may be a fractional number.

Figure 3:
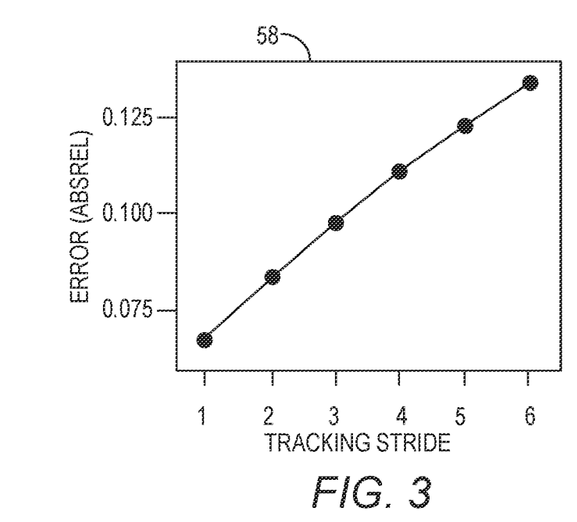
FIG. 3 is a graph that indicates that the absolute relative error between a tracked depth map and a ground truth depth map increases by 0.0133 per tracking stride increment on average.

FIG. 3 is a graph 58 that indicates that the absolute relative error between a tracked depth map and a ground truth depth map increases by 0.0133 per tracking stride increment on average. Thus, a lower tracking stride results in less error.

Typically, even if the server 22 uses a state of the art graphic processing unit (GPU), the inference time (i.e., image processing time) of a typical deep neural network (DNN) is tens of milliseconds. As an example, a median inference time in a known object detection model is 69.5 milliseconds (ms) on an Nvidia V100 GPU. Moreover, the network transfer time also contributes to the latency. A round trip time (RTT) of a packet may be, by way of non-limiting example, a few milliseconds under Wi-Fi, 14-20 milliseconds under 5G mmWave, and 35-55 milliseconds under LTE. Accordingly, the image processing results typically return to the AR device 12 several image frames later, and hence the image processing results for a past image frame, i.e., the last server returned image processing results, has to be used for subsequent image frames until the next image processing result is returned from the server 22.

Figure 4A:
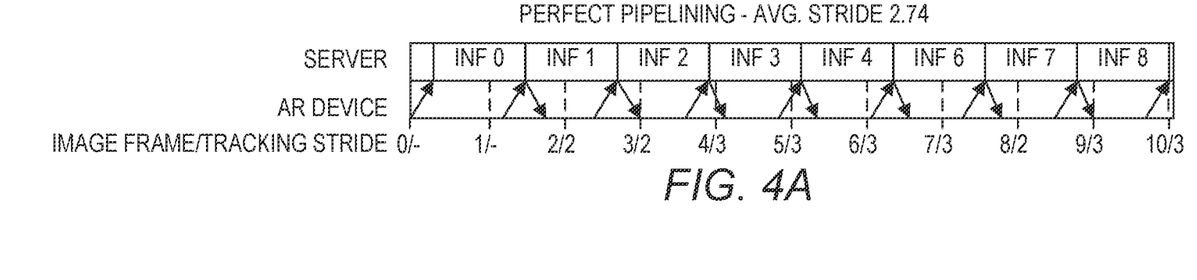
FIG. 4A illustrates average tracking stride results in a perfect pipelining schedule.

FIG. 4A illustrates average tracking stride results in a "perfect pipelining" schedule where image frames are provided to the server 22 such that there is no delay time between processing image frames by the server 22. Essentially, image frames are provided by the AR device 12 to the server 22 such that, as soon as the object detection MLM 32 finishes generating image processing results of an image frame, the object detection MLM 32 is presented with another image frame. In this example, the uplink transfer time (UTT) is 0.3 frame intervals (33.4 ms*0.3=~10 ms), the downlink transfer time (DTT) is 0.3 frame intervals, and the image processing time (INF) is 1.2 frame intervals (33.4 ms*1.2=~40 ms). Note that, in order to implement the perfect pipelining schedule, certain image frames are not provided by the AR device 12 to the server 22. In this example, image frame 5 (0 relative) was not sent by the AR device 12 to the server 22. The average tracking stride in this example is 2.74.

Figure 4B:
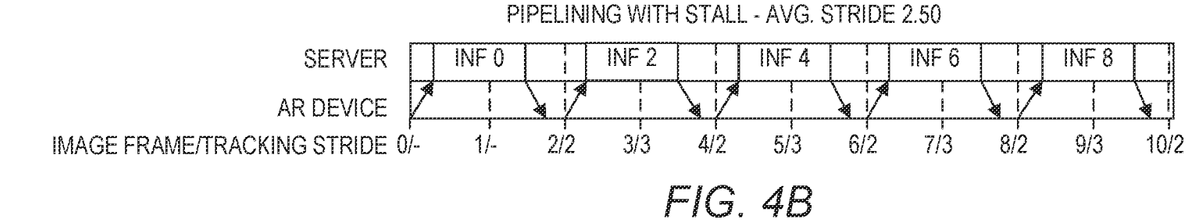
FIG. 4B illustrates average tracking stride results in a pipelining with stall schedule.

FIG. 4B illustrates average tracking stride results in a "pipelining with stall" schedule where, upon receiving image processing results from the server 22, the next generated image frame is sent by the AR device 12 to the server 22. This results in some image frames not being sent to the server 22 because image processing results of a previous frame had not been received. Again, the UTT is 0.3 frame intervals; the DTT is 0.3 frame intervals; and the image processing time (INF) is 1.2 frame intervals. In this example, image frames 1, 3, 5, and 7 were not sent by the AR device 12 to the server 22. The average tracking stride in this example is 2.50.

Figure 4C:
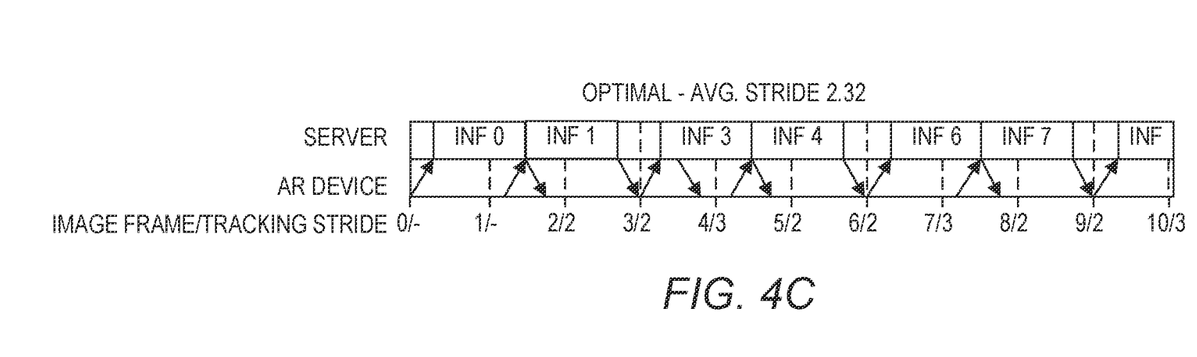
FIG. 4C illustrates average tracking stride results in accordance with embodiments disclosed herein.

FIG. 4C illustrates average tracking stride results in accordance with embodiments disclosed herein wherein an offloading schedule is determined such that the tracking stride is lower than either the perfect pipelining schedule (FIG. 4A) or the pipeline with stall schedule (FIG. 4B). The schedule strategically adapts between sending an older image frame to keep the object detection MLM busy and stalling the pipeline to send the next, more recent image frame. Again, the UTT is 0.3 frame intervals; the DTT is 0.3 frame intervals; and the image processing time (INF) is 1.2 frame intervals. In this example, image frames 2 and 5 were not sent by the AR device 12 to the server 22. The average tracking stride in this example is 2.32.

Figure 5:
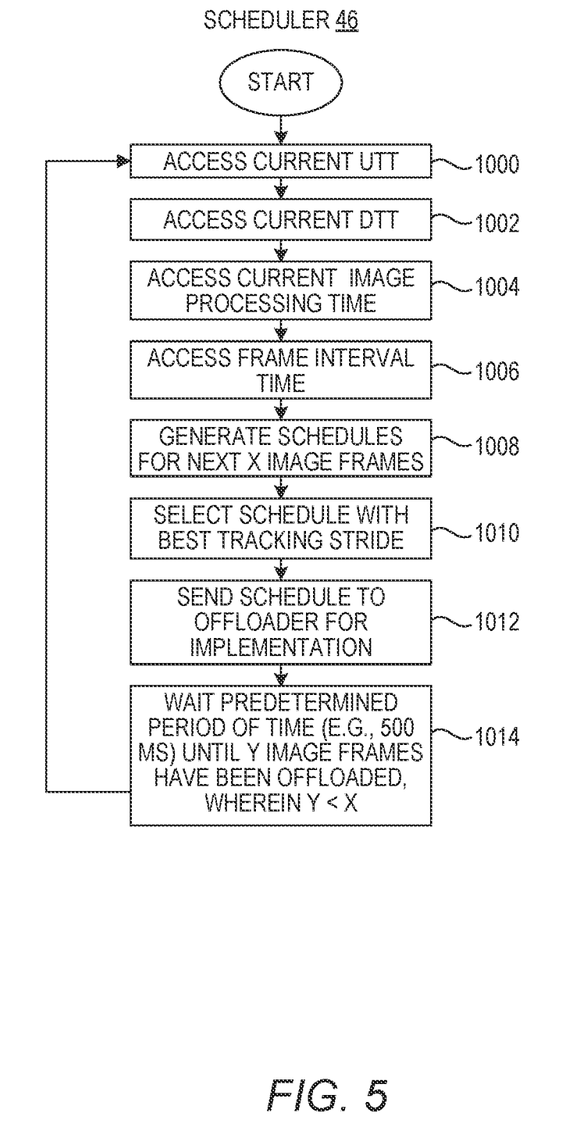
FIG. 5 is a flowchart illustrating a method for generating offloading schedules according to one embodiment.

The embodiments disclosed herein determine an offloading schedule that minimizes tracking stride over a sequence of image frames. FIG. 5 is a flowchart illustrating a method that may be implemented by the scheduler 46 according to one embodiment. The scheduler 46 determines the current UTT, DTT, and image processing time (FIG. 5, blocks 1000, 1002, and 1004). The scheduler 46 determines the frame interval time (FIG. 5, block 1006). The frame interval time is based on the frame rate of the camera 18.

The scheduler 46 generates a plurality of different potential schedules for offloading a subsequent X number of image frames during a particular time horizon (FIG. 5, block 1008). The time horizon may be any suitable time frame; however, as the time horizon increases, X increases, which in turn increases the number of potential schedules that could be analyzed. For example, for a time horizon of X image frames, a simple enumeration of the possible schedules gives a search space of $O(2^X)$, which becomes a substantially large number once X exceeds tens of frames. For example, for a camera operating at 30 frames per second, a 1-second horizon translates to 30 frames and a search space size of $2^{30}=1,073,741,824$.

To reduce the potential number of schedules, during schedule generation, the scheduler 46 may apply a greedy heuristic that eliminates schedules that cause significant congestion or under-utilization of the server 22. With an image processing time of tinf frame interval times, schedules that offload two image frames less than $\lfloor tinf \rfloor$ image frames apart at any point, or more than $\lceil tinf \rceil$ image frames apart at any point, are suboptimal in terms of tracking stride. This is because offloading two image frames (i, j) less than $\lfloor tinf \rfloor$ apart will cause image frame j to queue at least one frame time on the GPU, so it is suboptimal to offloading image frames (i, j+1). Similarly, offloading image frames (i, j) more than $\lceil tinf \rceil$ apart will cause an idle period of more than one frame interval time on the GPU before inference on j begins, so it is sub-optimal to offloading image frames (i, j−1). Large numbers of schedules can be pruned quickly in this manner. As an example, the scheduler 46 builds a schedule frame by frame. During schedule generation, if a first part of a schedule is already suboptimal (e.g., either congests or underutilizes the GPU as discussed above), the scheduler 46 prunes the schedule, and all other schedules that would have the same initial sequence of image frames. For example, if at image frame 10 the scheduler 46 determines that a certain sub-schedule of length 10 is already sub-optimal (e.g., congests the GPU), the scheduler 46 need not generate any schedule that starts with this sub-schedule, which would avoid the generation of $2^{20}$ (1,048,576) such schedules.

Table 1 below identifies the search space after the greedy heuristic is applied to prune all such schedules given different image processing times wherein X equals thirty image frames.

TABLE 1

(SEARCH SPACE AFTER GREEDY-BASED PRUNING HEURISTIC FOR A HORIZON OF 30 FRAMES)

| IMAGE PROCESSING TIME IN FRAME INTERVALS | SEARCH SPACE |
| --- | --- |
| 1-2 | 1,346,269 |
| 2-3 | 3329 |
| 3-4 | 285 |
| 4-5 | 71 |

Based on the UTT, the DTT, the image processing time, and the frame interval, the scheduler 46 calculates when each offloaded image frame will return from the server 22 and then determines the tracking stride for each image frame in the horizon. The scheduler 46 calculates the average tracking stride for each candidate schedule and selects the schedule with the lowest tracking stride (FIG. 5, block 1010). In some embodiments, the average tracking stride of a schedule S having a plurality of frames f may be determined by the following formula:

$$\frac{1}{|S|} \sum_{f \in S} \text{stride}(f)$$

It is noted that, while the above-described greedy heuristic significantly reduces the search space, the search space is still relatively large when the image processing time is small. For example, when the image processing time is between 1-2 frame intervals, the search space is 1,346,269 potential schedules. This is because a faster image processing time enables more image frames to be offloaded within a fixed horizon, thus inflating the search space. By plotting the cumulative distribution function (CDF) of average tracking strides for the schedules in the search space, it has been determined that the average tracking stride distribution does not have a long tail for small tracking strides. In other words, there exist many schedules that give average tracking strides close to that of the optimal schedule. Therefore, the scheduler 46 may further reduce the search space by randomly sampling and analyzing a subset of N candidate schedules, with a high probability that some of these candidate schedules will be close to optimal. For example, setting N to 2000 results in a high probability that a sampled candidate schedule will be close or equal to the optimal schedule. In practice, in the example presented above with an initial search space of 1,346,269 potential schedules, the scheduler 46 takes 3-7 ms to generate and select the optimal schedule, and thus compared to the frame rate of the camera 18 is done in real-time.

The scheduler 46 sends the selected schedule to the offloader 42 for implementation (FIG. 5, block 1012). In some implementations, the schedule generation is based on model predictive control (MPC). Accordingly, the scheduler 46 continuously generates new schedules prior to the previous schedule being completely utilized. Thus, the scheduler 46 waits a predetermined period of time during which the schedule will be partially implemented, and then repeats the process described above (FIG. 5, block 1014). In this example, the scheduler 46 generates a new schedule every 500 ms.

Figure 6:
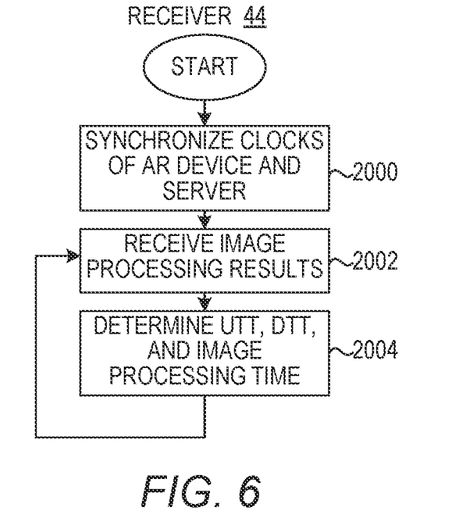
FIG. 6 is a flowchart of a method for determining an uplink transfer time, a downlink transfer time, and an image processing time according to one embodiment.

FIG. 6 is a flowchart of a method via which the receiver 44 determines the UTT, the DTT, and the image processing time according to one embodiment. Initially, the receiver 44 synchronizes a clock of the AR device 12 (not illustrated) with that of the server 22 (FIG. 6, block 2000). The synchronization process may be implemented by any conventional clock synchronization mechanism. In one embodiment, it is assumed that the clock drift remains consistent across time, and that the UTT and DTT are symmetrical. The AR device 12 may send a small probing packet to the server 22 at time to. The server 22 receives the packet, and sends back the current timestamp t1 immediately, which arrives at the AR device 12 at t2. The AR device 12 calculates the RTT to be t2−t0 and the clock drift to be t1−(t0+RTT/2). The clock drift may be averaged over 5 measurements.

As will be discussed below, when the offloader 42 offloads an image frame to the server 22, the offloader 42 stores a timestamp to identifying the offloading time. The server 22, for each image frame, records the start time $t_1$ and finish time $t_2$ of the image processing time (e.g., the DNN inference time), and sends $t_1$ and $t_2$ timestamps to the receiver 44 along with the image processing results. The receiver 44 receives the results at time $t_3$ and calculates the UTT to be $t_1-t_2-$ clock drift, the DTT to be $t_3-t_2-$ clock drift, and the image processing time to be $t_2-t_1$.

The receiver 44 stores the UTT, the DTT, and the image processing time for use by the scheduler 46 as described above. In some embodiments, the receiver 44 maintains a moving window average for each of the UTT, the DTT, and the image processing time for use by the scheduler 46 to smooth out any perturbations. Note that the UTT, the DTT, and the image frame processing time may be determined each image frame or any other specified rate, thus dynamically adapting the generated schedule to changing environmental or other conditions that may impact the UTT and DTT in a wireless environment.

Figure 7:
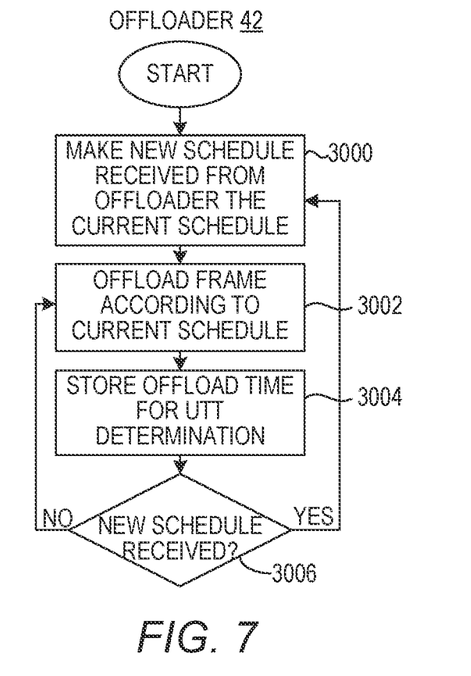
FIG. 7 is a flowchart of a method for offloading image frames in accordance with a most recently received schedule according to one embodiment.

FIG. 7 is a flowchart of a method via which the offloader 42 offloads image frames in accordance with the most recently received schedule. The offloader 42 receives, from the scheduler 46, a new schedule, and makes the new schedule the current schedule (FIG. 7, block 3000). The offloader 42 offloads the next generated image frame in accordance with the current schedule (FIG. 7, block 3002). The offloader 42 stores the offload time for the UTT determination by the receiver 44, as discussed above (FIG. 7, block 3004). The offloader 42 determines if a new schedule has been received from the scheduler 46. If not, the offloader 42 returns to block 3002 and offloads the next image frame in accordance with the current schedule (FIG. 7, block 3006). If, at block 3006, the offloader 42 determines that a new schedule has been received from the scheduler 46, the offloader 42 returns to block 3000 and makes the new schedule the current schedule.

Figure 8:
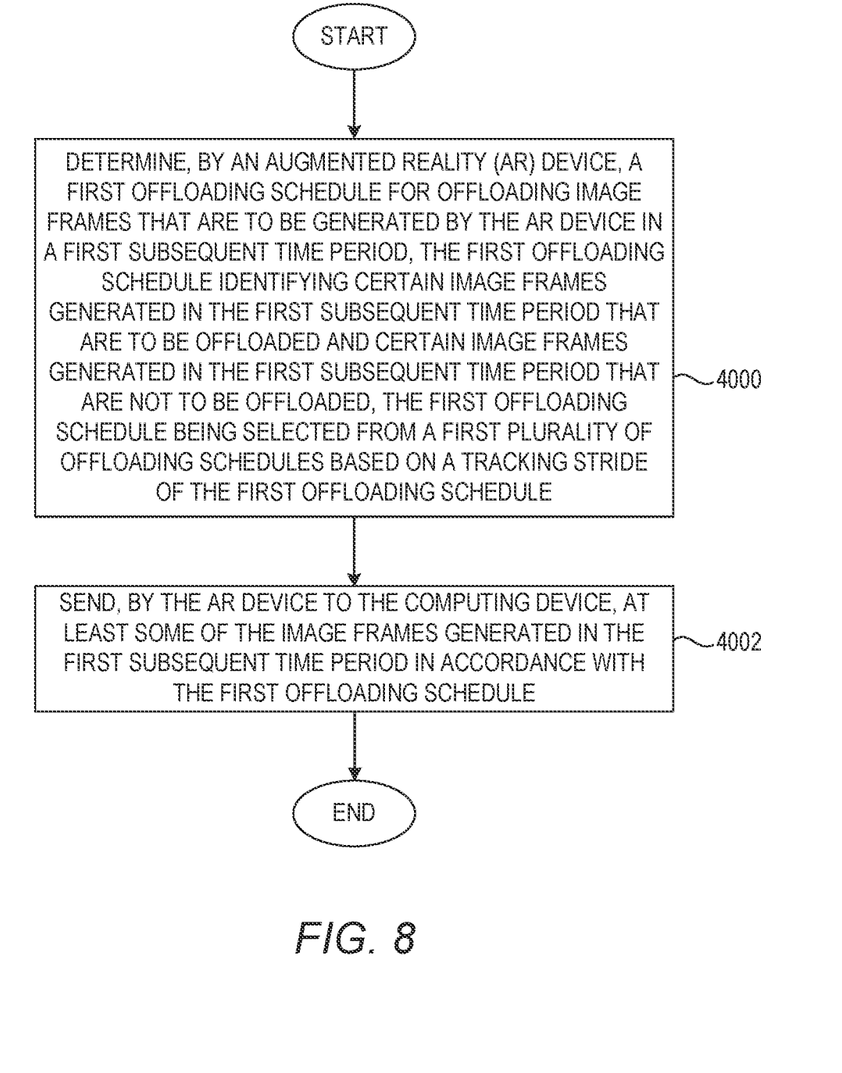
FIG. 8 is a flowchart of a method for optimizing image offloading in edge-assisted AR according to some embodiments.

FIG. 8 is a flowchart of a method for optimizing image offloading in edge-assisted AR according to some embodiments. FIG. 8 will be discussed in conjunction with FIG. 1. The AR device 12 determines an offloading schedule for offloading image frames that are to be generated by the AR device 12 in a subsequent time period, such as the next second, wherein the offloading schedule identifies certain image frames generated in the subsequent time period that are to be offloaded and certain image frames generated in the subsequent time period that are not to be offloaded, the offloading schedule being selected from a plurality of offloading schedules based on a tracking stride of the offloading schedule (FIG. 8, block 4000). The offloading schedule may identify the image frames to be offloaded and those not to be offloaded in any suitable manner. In one embodiment, a simple bit vector may be used and corresponding values of 1 and 0 may be used, respectively, to indicate whether an image frame is to be offloaded or not. The AR device 12 sends to the computing device, such as the server 22, at least some of the image frames generated in the subsequent time period in accordance with the offloading schedule (FIG. 8, block 4002).

Figure 9:
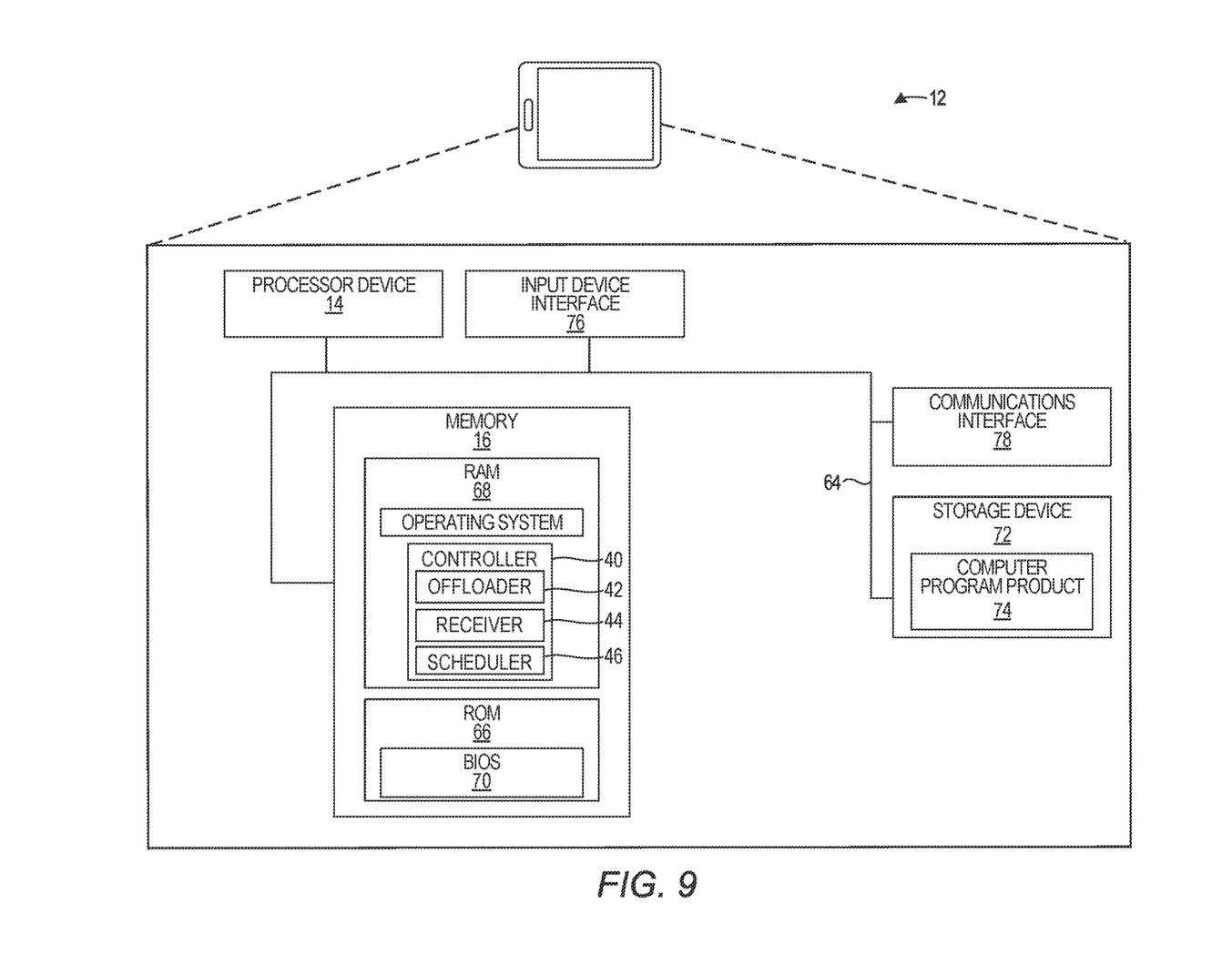
FIG. 9 is a block diagram of an AR device according to some embodiments.

FIG. 9 is a block diagram of the AR device 12 suitable for implementing the embodiments disclosed herein. The AR device 12 may comprise any computing or electronic device capable of including firmware, hardware, and/or executing software instructions to implement the functionality described herein, such as a computing tablet, a smartphone, a laptop computer, a video see-through head-mounted AR device, an optical see-through head-mounted AR device, or the like. The AR device 12 includes the processor device 14, the system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the AR device 12. The volatile memory 68 may also include a high-speed RAM, such as static RAM, for caching data.

The AR device 12 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system and one or more program modules, such as the controller 40, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 40 in the volatile memory 68, may serve as a controller, or control system, for the AR device 12 that is to implement the functionality described herein.

An operator, such as the user 38, may also be able to enter one or more commands through a keyboard (not illustrated), a pointing device such as a mouse (not illustrated), or a touch-sensitive surface such as a display device. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The AR device 12 may also include a communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by an augmented reality (AR) device, a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule; and
   sending, by the AR device to a computing device, at least some of the image frames generated in the first subsequent time period in accordance with the first offloading schedule.

2. The method of claim 1 wherein the tracking stride identifies a frame difference between a most recently generated image frame and a most recent previous image frame for which the AR device has received image processing results from the computing device.

3. The method of claim 1 further comprising:
   determining, by the AR device, the first offloading schedule based on an uplink transfer time (UTT) for an image frame to be communicated from the AR device to the computing device, a downlink transfer time (DTT) for image processing results generated by the computing device based on the image frame to be communicated from the computing device to the AR device, an image processing time for the computing device to process the image frame to generate the image processing results, and a camera frame rate of the AR device.

4. The method of claim 3 further comprising:
   sending, by the AR device to the computing device, a first image frame for image processing;
   storing, by the AR device, a send timestamp that identifies a time at which the first image frame was sent to the computing device;
   receiving, by the AR device, image processing results from the computing device based on the first image frame, the image processing results comprising a start processing timestamp that identifies a start time of image processing by the computing device, a finish processing timestamp that identifies a finish time of the image processing by the computing device;
   determining, by the AR device, a receive timestamp that identifies a time that the image processing results were received by the AR device; and
   determining the UTT, the DTT, and the image processing time of the first image frame based on the send timestamp, the start processing timestamp, the finish processing timestamp, and the receive timestamp.

5. The method of claim 4 further comprising:
   determining, by the AR device, the UTT, the DTT, and the image processing time of the first image frame periodically during a continuous AR session.

6. The method of claim 4 further comprising:
   determining, by the AR device, the UTT, the DTT, and the image processing time each time the AR device sends an image frame to the computing device for image processing.

7. The method of claim 4 further comprising:
   determining, by the AR device, the UTT, the DTT, and the image processing time based on corresponding moving window averages of consecutively determined UTTs, DTTs, and image processing times.

8. The method of claim 1 further comprising:
   wherein determining the first offloading schedule further comprises:
      determining, based on an uplink transfer time (UTT) for an image frame to be communicated from the AR device to the computing device, a downlink transfer time (DTT) for image processing results generated by the computing device based on the image frame to be communicated from the computing device to the AR device, an image processing time for the computing device to process the image frame to generate the image processing results, and a camera frame rate of the AR device, a plurality of offloading schedules; and
      selecting the first offloading schedule from the plurality of offloading schedules based on the tracking stride of the first offloading schedule.

9. The method of claim 8 wherein selecting the first offloading schedule from the plurality of offloading schedules based on the tracking stride of the first offloading schedule further comprises:
   analyzing a subset of the plurality of offloading schedules;
   determining a tracking stride of each offloading schedule in the subset of the plurality of offloading schedules; and
   selecting the first offloading schedule in response to the first offloading schedule having a lowest tracking stride of each offloading schedule in the subset of the plurality of offloading schedules.

10. The method of claim 9 wherein the plurality of offloading schedules is greater than 250,000 offloading schedules.

11. The method of claim 9 wherein analyzing the subset of the plurality of offloading schedules comprises randomly selecting the subset of the plurality of offloading schedules from the plurality of offloading schedules.

12. The method of claim 8 wherein T-inf equals the image processing time of the computing device divided by an image frame interval of the AR device, and wherein prior to selecting the first offloading schedule from the first plurality of offloading schedules based on the tracking stride of the first offloading schedule, pruning the first plurality of offloading schedules to remove each offloading schedule that offloads two image frames that are less than T-inf frames apart at any point in the offloading schedule, and pruning the first plurality of offloading schedules to remove each offloading schedule that offloads two image frames that are more than T-inf frames apart at any point in the offloading schedule.

13. The method of claim 8 further comprising:
generating, by the AR device based on the image processing results, AR imagery comprising real-world imagery depicting a real-world scene within a field of view of a camera of the AR device, and computer-generated imagery depicting an object not in the real-world scene.

14. The method of claim 1 wherein sending, by the AR device to the computing device, the at least some of the image frames generated in the first subsequent time period in accordance with the first offloading schedule comprises sending, by the AR device to the computing device, the at least some of the image frames generated in the first subsequent time period in accordance with the first offloading schedule via a cellular network.

15. The method of claim 1 further comprising:
prior to generation of each image frame in the first subsequent time period, determining, by the AR device, a second offloading schedule for offloading image frames that are to be generated by the AR device in a second subsequent time period, the second subsequent time period overlapping the first subsequent time period, the second offloading schedule identifying certain image frames generated in the second subsequent time period that are to be offloaded and certain image frames generated in the second subsequent time period that are not to be offloaded, the second offloading schedule being selected from a second plurality of offloading schedules based on a tracking stride of the second offloading schedule; and
sending, by the AR device to the computing device, at least some of the image frames generated in the second subsequent time period in accordance with the second offloading schedule.

16. An augmented reality (AR) device, comprising:
a camera;
a memory; and
a processor device coupled to the memory and the camera and being operable to:
determine a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule; and
send, to a computing device, at least some of the image frames generated in the first subsequent time period in accordance with the first offloading schedule.

17. The AR device of claim 16 wherein the tracking stride identifies a frame difference between a most recently generated image frame and a most recent previous earlier image frame for which the AR device has received image processing results from the computing device.

18. The AR device of claim 16 wherein the processor device is further operable to:
determine the first offloading schedule based on an uplink transfer time (UTT) for an image frame to be communicated from the AR device to the computing device, a downlink transfer time (DTT) for image processing results generated by the computing device based on the image frame to be communicated from the computing device to the AR device, an image processing time for the computing device to process the image frame to generate the image processing results, and a camera frame rate of the AR device.

19. The AR device of claim 16 wherein to determine the first offloading schedule, the processor device is further operable to:
determine, based on an uplink transfer time (UTT) for an image frame to be communicated from the AR device to the computing device, a downlink transfer time (DTT) for image processing results generated by the computing device based on the image frame to be communicated from the computing device to the AR device, an image processing time for the computing device to process the image frame to generate the image processing results, and a camera frame rate of the AR device, a plurality of offloading schedules; and
select the first offloading schedule from the plurality of offloading schedules based on the tracking stride of the first offloading schedule.

20. A non-transitory computer-readable storage medium that includes executable instructions configured to cause a processor device of an augmented reality (AR) device to:
determine a first offloading schedule for offloading image frames that are to be generated by the AR device in a first subsequent time period, the first offloading schedule identifying certain image frames generated in the first subsequent time period that are to be offloaded and certain image frames generated in the first subsequent time period that are not to be offloaded, the first offloading schedule being selected from a first plurality of offloading schedules based on a tracking stride of the first offloading schedule; and
send, to a computing device, at least some of the image frames generated in the first subsequent time period in accordance with the first offloading schedule.

* * * * *